United States Patent
Balan et al.

(10) Patent No.: US 11,937,125 B2
(45) Date of Patent: Mar. 19, 2024

(54) LOAD BALANCING IN SYSTEM WITH BEAMFORMED RADIO ACCESS

(71) Applicant: Nokia Technologies Oy, Espoo (FI)

(72) Inventors: Irina-Mihaela Balan, Munich (DE); Ingo Viering, Munich (DE)

(73) Assignee: Nokia Technologies Oy, Espoo (FI)

( * ) Notice: Subject to any disclaimer, the term of this patent is extended or adjusted under 35 U.S.C. 154(b) by 281 days.

(21) Appl. No.: 17/632,565

(22) PCT Filed: Aug. 13, 2019

(86) PCT No.: PCT/EP2019/071649
§ 371 (c)(1),
(2) Date: Feb. 3, 2022

(87) PCT Pub. No.: WO2021/028021
PCT Pub. Date: Feb. 18, 2021

(65) Prior Publication Data
US 2022/0279382 A1 Sep. 1, 2022

(51) Int. Cl.
*H04W 28/08* (2023.01)
*H04W 16/28* (2009.01)
*H04W 28/086* (2023.01)
*H04W 36/22* (2009.01)

(52) U.S. Cl.
CPC ......... *H04W 28/086* (2023.05); *H04W 16/28* (2013.01); *H04W 36/22* (2013.01)

(58) Field of Classification Search
CPC .... H04W 28/086; H04W 16/28; H04W 36/22
See application file for complete search history.

(56) References Cited

U.S. PATENT DOCUMENTS

2019/0335376 A1 10/2019 Huang et al.
2023/0262520 A1* 8/2023 Sarkar .................. H04B 7/0617
370/235

FOREIGN PATENT DOCUMENTS

WO WO 2018/176418 A1 10/2018

OTHER PUBLICATIONS

3GPP TSG-RAN WG3 #103, Athens, Greece, Feb. 25-Mar. 1, 2019, R3-190825, "Enhancements to load sharing and load balance", Ericsson, 5 pgs.

* cited by examiner

*Primary Examiner* — Sulaiman Nooristany
(74) *Attorney, Agent, or Firm* — Barta Jones, PLLC

(57) ABSTRACT

There are provided measures for enabling/realizing load balancing between neighboring cells in a system with beamformed radio access. Such measures exemplarily include determining a load balancing condition, including at least one beam as a candidate beam and at least one target radio access entity for offloading terminal entities being currently served by the candidate beam, specifying a load balancing hypothesis for a hypothetical case of deactivation of the candidate beam, including information on an impact of the hypothetical beam deactivation, inquiring non-/acceptance of deactivation of the candidate beam from the at least one target radio access entity on the basis of the load balancing hypothesis, and deactivating the candidate beam if acceptance of deactivation of the candidate beam is inquired from the at least one target radio access entity.

20 Claims, 7 Drawing Sheets

LOAD BALANCING IN SYSTEM WITH BEAMFORMED RADIO ACCESS

CROSS REFERENCE TO RELATED APPLICATION

This patent application is a U.S. National Stage application of International Patent Application Number PCT/EP2019/071649 filed Aug. 13, 2019, which is hereby incorporated by reference in its entirety.

FIELD

The present disclosure relates to load balancing in a system with beamformed radio access. More specifically, the present disclosure relates to measures/mechanisms (including methods, apparatuses (i.e. devices and/or functions) and computer program products) for enabling/realizing load balancing between neighboring cells in a system with beamformed radio access, i.e. a system in which at least a load balancing source cell uses beamforming so as to provide beamformed radio access.

BACKGROUND

Basically, the present disclosure relates to communication systems which (at least optionally) employ beamforming for providing radio access, i.e. communication systems with beamformed radio access. As compared with legacy communication systems (such as e.g. LTE systems), in which cell coverage is provided/achieved by a single omnidirectional (and potentially sectorized) radiation or beam from an antenna, communication systems with beamformed radio access (such as e.g. 5G/NR systems) provide/achieve cell coverage using beamforming, i.e. a plurality of beams from an antenna. Accordingly, in such systems, plural beams provide beamformed radio access in a cell so as to achieve decent coverage.

As used herein, a system with beamformed radio access means and encompasses a system in which, among cells participating in or being involved in a technique according to the present disclosure, one cell uses beamforming so as to provide beamformed radio access. In this regard, it is to be noted that beamforming is an optional feature in 5G/NR systems, which can be used to increase cell coverage, thereby counteracting cell shrinkage resulting from use of higher frequencies.

In 5G/NR systems, analog, digital or hybrid beamforming techniques may be used depending on the frequency or frequency band (FR1<6 GHz or FR2>6 GHz) and hardware limitations. In FR2, RF beam forming is typically used, which means that one or a few beams will be active (i.e. scheduled) at the same time, while the other beams have to wait to be scheduled. This leads to reduced intra-cell/inter-beam interference but also increased delays which may be critical for some services. This also means that a beam as such cannot be overloaded, but only a cell can be overloaded, as the beams take turn in using all the resources of the cell, while a more crowded beam should be scheduled more often than a less crowded beam in order to achieve some sort of throughput fairness. In fully digital beamforming, the reuse of resources is possible in every beam.

Further, the present disclosure relates to load balancing, more specifically mobility load balancing. Generally, (mobility) load balancing refers to a functionality with which cells suffering high load can transfer load (i.e. perform offloading) to other (neighboring) cells experiencing low load, namely cells which have spare capacity.

In real systems, the load is typically not evenly distributed between cells, i.e. the load in the cells is not necessarily uniform. That is, there may be one cell with (i.e. currently serving) a large number of users leading to high load (and thereby smaller throughputs), whereas there may be one or several neighboring cells with (i.e. currently serving) a—potentially even much—smaller number of users leading to low load (and thereby higher throughputs). In such situation, it is desirable to balance the load across multiple (neighboring) cells.

Legacy load balancing mechanisms, which are designed for systems where cell coverage is provided/achieved by a single omnidirectional (and potentially sectorized) radiation from an antenna, usually impact all the users in the overloaded cell, which is not desirable. For example, legacy load balancing mechanisms accomplish load balancing, i.e. offloading of users from the overloaded cell to a neighboring non-overloaded cell, by moving the cell boundary between the overloaded cell and the non-overloaded cell so as to reduce the size or coverage area of the overloaded cell. Such cell boundary shifting or cell coverage shrinkage may be accomplished via power adjustment or handover setting adjustment. In power adjustment, the overloaded cell reduces its Tx power and the non-overloaded neighboring cell increases its Tx power, which means that the SNR/SINR of all UEs in the overloaded cell will go down, which is not desired. In handover setting adjustment, the handover conditions are changed (e.g. the Cell Individual Offset (CIO)) so as to facilitate or promote handovers from the overloaded cell to the non-overloaded cell making the neighboring cell more attractive for edge UEs, but does also not provide for a desired gain, as the interference for the handed-over UEs is large due to their previously serving cell.

As mentioned above, (mobility) load balancing for legacy systems, such as e.g. LTE systems, is a well-known mechanism that virtually shifts the boundary of the overloaded cell inward in order to force UEs to hand over to a less loaded neighboring cell. The overloaded cell may assess, if the neighboring cell can carry extra load based on load information received from it (e.g. Composite Available Capacity (CAC), as included in the Resource Status Response/Update messages). Any change in the overloaded cell, such as a change of the CIO may be signaled to the neighboring cell via the Mobility Change setting message over the X2 interface.

In legacy load balancing mechanisms, there is however no negotiation of a change in the overloaded cell, but such change is implemented by the overloaded cell in an autonomous/selfish manner. Hence, the outcome of such load balancing is in most cases not ideal. Also, the target cell is not given any information about the possible impact the handed-over UEs will have on its own load or any other resource or service-related indicators, which may prove critical for service provisioning or continuity.

Therefore, there is a desire for measures/mechanisms for (enabling/realizing) load balancing between neighboring cells in a system with beamformed radio access. Stated in other words, there is a desire for load balancing measures/mechanisms, which are suitable/effective for a system providing/achieving cell coverage using beamforming, i.e. a plurality of beams, while overcoming or at least mitigating deficiencies of legacy load balancing mechanisms.

SUMMARY

Various exemplifying embodiments of the present disclosure aim at addressing at least part of the above issues and/or problems and drawbacks.

Various aspects of exemplifying embodiments of the present disclosure are set out in the appended claims.

According to an example aspect of the present disclosure, there is provided a method, which is preferably operable at or by a radio access entity, comprising determining a load balancing condition, including at least one beam of beams providing beamformed radio access as a candidate beam and at least one target radio access entity for offloading terminal entities being currently served by the candidate beam, specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, inquiring non-/acceptance of deactivation of the candidate beam from the at least one target radio access entity on the basis of the load balancing hypothesis, and deactivating the candidate beam if acceptance of deactivation of the candidate beam is inquired from the at least one target radio access entity.

According to an example aspect of the present disclosure, there is provided a method, which is preferably operable at or by a radio access entity comprising obtaining an inquiry of non-/acceptance of deactivation of a candidate beam, which is at least one beam of beams providing beamformed radio access, from a source radio access entity, said inquiry specifying a load balancing hypothesis for a hypothetical case of deactivation of the candidate beam, including information on an impact of the hypothetical beam deactivation with respect to terminal entities being currently served by the candidate beam by offloading to the radio access entity, deciding on non-/acceptance of deactivation of the candidate beam on the basis of cell information of a cell of the radio access entity, including at least information on a load in the cell of the radio access entity, and providing, to the source radio access entity, an indication of non-/acceptance of deactivation of the candidate beam as a deciding result.

According to an example aspect of the present disclosure, there is provided an apparatus, which is preferably operable as or at a radio access entity, comprising at least one processor and at least one memory including a computer program code, wherein the at least one memory and the computer program code are configured, with the at least one processor, to cause the apparatus to perform at least the following: determining a load balancing condition, including at least one beam of beams providing beamformed radio access as a candidate beam and at least one target radio access entity for offloading terminal entities being currently served by the candidate beam, specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, inquiring non-/acceptance of deactivation of the candidate beam from the at least one target radio access entity on the basis of the load balancing hypothesis, and deactivating the candidate beam if acceptance of deactivation of the candidate beam is inquired from the at least one target radio access entity According to an example aspect of the present disclosure, there is provided an apparatus, which is preferably operable as or at a radio access entity, comprising at least one processor and at least one memory including a computer program code, wherein the at least one memory and the computer program code are configured, with the at least one processor, to cause the apparatus to perform at least the following: obtaining an inquiry of non-/acceptance of deactivation of a candidate beam, which is at least one beam of beams providing beamformed radio access, from a source radio access entity, said inquiry specifying a load balancing hypothesis for a hypothetical case of deactivation of the candidate beam, including information on an impact of the hypothetical beam deactivation with respect to terminal entities being currently served by the candidate beam by offloading to the radio access entity, deciding on non-/acceptance of deactivation of the candidate beam on the basis of cell information of a cell of the radio access entity, including at least information on a load in the cell of the radio access entity, and providing, to the source radio access entity, an indication of non-/acceptance of deactivation of the candidate beam as a deciding result.

According to an example aspect of the present disclosure, there is provided an apparatus, which is preferably operable as or at a radio access entity, comprising means for determining a load balancing condition, including at least one beam of beams providing beamformed radio access as a candidate beam and at least one target radio access entity for offloading terminal entities being currently served by the candidate beam, means for specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, means for inquiring non-/acceptance of deactivation of the candidate beam from the at least one target radio access entity on the basis of the load balancing hypothesis, and means for deactivating the candidate beam if acceptance of deactivation of the candidate beam is inquired from the at least one target radio access entity.

According to an example aspect of the present disclosure, there is provided an apparatus, which is preferably operable as or at a radio access entity, comprising means for obtaining an inquiry of non-/acceptance of deactivation of a candidate beam, which is at least one beam of beams providing beamformed radio access, from a source radio access entity, said inquiry specifying a load balancing hypothesis for a hypothetical case of deactivation of the candidate beam, including information on an impact of the hypothetical beam deactivation with respect to terminal entities being currently served by the candidate beam by offloading to the radio access entity, means for deciding on non-/acceptance of deactivation of the candidate beam on the basis of cell information of a cell of the radio access entity, including at least information on a load in the cell of the radio access entity, and means for providing, to the source radio access entity, an indication of non-/acceptance of deactivation of the candidate beam as a deciding result.

According to various developments/modifications, any one of the aforementioned method-related and/or apparatus-related example aspects of the present disclosure may include one or more of the following features:
- the determining may comprise identifying one or more beams with a highest number of served terminal entities and/or a highest load in a cell of the radio access entity as the candidate beam,
- the determining may comprise identifying a load balancing situation in which a load in a cell of the radio access entity is high and a load in at least one target cell of the at least one target radio access entity is low, the determining may comprise identifying the at least one target radio access entity as a neighboring radio access entity of a neighboring cell to a cell of the radio access entity, the specifying may comprise acquiring information on number and characteristics of the terminal entities being currently served by the candidate beam, wherein the load balancing hypothesis is specified based on the acquired information, the specifying may comprise retrieving, for the terminal entities being currently served by the candidate beam, results of radio resource management measurements with respect to one or more beams providing beamformed radio access in a cell of the radio access entity and radio access in at least one cell of the at least one radio access entity, and evaluating whether or not a coverage hole for one or more of the terminal entities being currently served by the candidate beam is caused when deactivating the candidate beam based on the retrieved radio resource management measurements results, wherein the load balancing hypothesis is specified if it is evaluated that a coverage hole is not caused for any one of the terminal entities being currently served by the candidate beam when deactivating the candidate beam, the specifying may comprise retrieving, for the terminal entities being currently served by the candidate beam, radio resource management indicators with respect to one or more beams providing beamformed radio access in a cell of the radio access entity and radio access in at least one cell of the at least one radio access entity, and/or characteristic information regarding operation/performance and/or service provisioning in the cell of the radio access entity, and setting the information on the impact of the hypothetical beam deactivation with respect to the terminal entities being currently served by the candidate beam based on the retrieved radio resource management indicators and/or characteristic information, the information on the impact of the hypothetical beam deactivation for a respective candidate beam may comprise a beam identifier of the beam subject to hypothetical beam deactivation and one or more of a number of terminal entities expected to be offloaded, a quality-of-service indicator of each terminal entity expected to be offloaded, a network slice identifier of each terminal entity expected to be offloaded, at least one beam identifier of at least one beam for serving terminal entities expected to be offloaded, if the at least one radio access entity uses beamformed radio access, and at least one projected signal quality indication of each terminal entity expected to be offloaded, the inquiring may comprise issuing, to the at least one target radio access entity, a request message, such as Mobility Change Request, including an information element containing the information on the impact of the hypothetical beam deactivation for a respective candidate beam, and obtaining, from the at least one target radio access entity, a response message, such as Mobility Change Acknowledge, including an information element containing an indication of acceptance of deactivation of at least one beam of a respective candidate beam, or a failure message, such as Mobility Change Failure, including an information element containing an indication of non-/acceptance of deactivation of any candidate beam, the inquiry may be obtained by a request message, such as Mobility Change Request, including an information element containing the information on the impact of the hypothetical beam deactivation for a respective candidate beam, the indication of non-/acceptance of deactivation of the candidate beam may be provided by, a response message, such as Mobility Change Acknowledge, including an information element containing an indication of acceptance of deactivation of a respective candidate beam, or a failure message, such as Mobility Change Failure, including an information element containing an indication of non-/acceptance of deactivation of any candidate beam.

the cell information may include information regarding operation/performance and/or service provisioning of terminal entities being served in the cell of the radio access entity, a cell of the radio access entity and a cell of the at least one target radio access entity may employ the same carrier frequency, the radio access entity and the at least one radio access entity may serve or relate to neighboring cells, the radio access entity and the at least one radio access entity may be radio access entities in a 5G/NR communication system.

According to an example aspect of the present disclosure, there is provided a computer program product comprising (computer-executable) computer program code which, when the program code is executed (or run) on a computer or the program is run on a computer (e.g. a computer of an apparatus according to any one of the aforementioned apparatus-related example aspects of the present disclosure), is configured to cause the computer to carry out the method according to any one of the aforementioned method-related example aspects of the present disclosure.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned exemplary aspects of the present disclosure are set out in the following.

By way of exemplifying embodiments of the present disclosure, load balancing between neighboring cells in a system with beamformed radio access (in which at least a load balancing source cell uses beamforming so as to provide beamformed radio access) can be enabled/realized. Namely, load balancing measures/mechanisms are provided, which are suitable/effective for a system providing/achieving cell coverage using beamforming, i.e. a plurality of beams, while overcoming or at least mitigating deficiencies of legacy load balancing mechanisms.

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
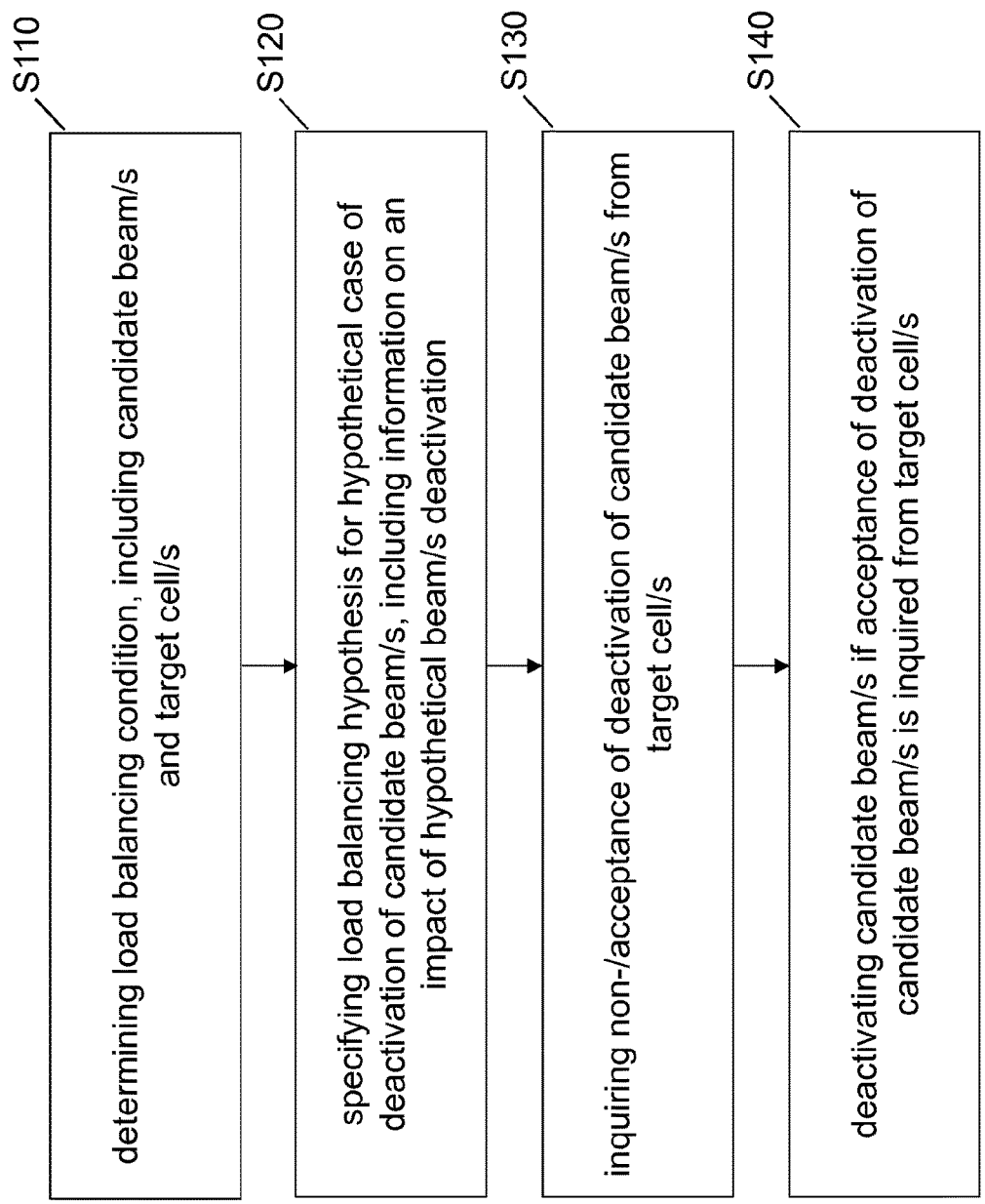
FIG. 1 shows a flowchart illustrating an example of a method, which is operable at or by a radio access entity acting as/in a source cell of load balancing, according to at least one exemplifying embodiment.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to specifications being used as non-limiting examples for certain exemplifying network configurations and system deployments. Namely, the following description mainly refers to 3GPP standards, specially referring to 5G/NR standardization, being used as non-limiting examples. As such, the description of exemplifying embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or exemplifying embodiments described herein are applicable to it.

Hereinafter, various exemplifying embodiments and implementations of the present disclosure and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words "comprising" and "including" should be understood as not limiting the described exemplifying embodiments and implementations to consist of only those features that have been mentioned, and such exemplifying embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g. wired or wireless) and on the other hand may also comprise an arbitrary number of intermediary functional blocks or entities not shown.

According to exemplifying embodiments of the present disclosure, in general terms, there are provided measures/mechanisms (including methods, apparatuses (i.e. devices and/or functions) and computer program products) for enabling/realizing load balancing between neighboring cells in a system with beamformed radio access, i.e. load balancing measures/mechanisms, which are suitable/effective for a system providing/achieving cell coverage using beamforming, i.e. a plurality of beams, while overcoming or at least mitigating deficiencies of legacy load balancing mechanisms.

Herein, load mainly refers to a somewhat persistent load concentration, e.g. an event which makes several UEs gathering in the same area and uploading videos and pictures, thus creating significantly more traffic than a cell of this area was planned for.

According to exemplifying embodiments of the present disclosure, there is generally provided a technique in which a source radio access entity determines a load balancing condition, including at least one beam of beams providing beamformed radio access as a candidate beam and at least one target radio access entity for offloading terminal entities being currently served by the candidate beam, and deactivates the at least one candidate beam to offload terminals to the at least one target radio access entity on the basis of the load balancing condition. Generally, a beam deactivation decision can be taken at/by the source radio access entity either cooperatively (by negotiation/agreement with the at least one target radio access entity) or autonomously.

In such technique, the source radio access entity represents a radio access entity acting as/in a source cell of load balancing (i.e. an overloaded cell), and the at least one target radio access entity represents one or more radio access entities acting as/in a target cell of load balancing (i.e. a non-overloaded cell). The load balancing source cell uses beamforming so as to provide beamformed radio access, while the load balancing target cell can but does not need to use beamforming. That is, the load balancing source cell uses multiple beams for serving terminal entities, while the load balancing source cell uses either a single (omnidirectional) radiation/beam or multiple beams for serving terminal entities.

FIG. 1 shows a flowchart illustrating an example of a method, which is operable at or by a radio access entity acting as/in a source cell of load balancing (i.e. an overloaded cell), according to at least one exemplifying embodiment. The method of FIG. 1 can be performed/executed e.g. by a gNB of a 5G/NR system, representing a radio access entity which employs beamforming for providing radio access, i.e. a plurality of beams for providing/achieving cell coverage. For example, the method of FIG. 1 can be performed/executed by Cell A or its radio access entity, as illustrated in any one of FIGS. 3 and 4.

As shown in FIG. 1, a method according to at least one exemplifying embodiment comprises an operation (S110) of determining a load balancing condition, including at least one beam of beams providing beamformed radio access as a candidate beam and at least one target radio access entity (i.e. a radio access entity, such as another gNB of a 5G/NR system, acting as/in a (neighboring) target cell of load balancing (i.e. a non-overloaded cell) for offloading terminal entities being currently served by the candidate beam, an operation (S120) of specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, an operation (S130) of inquiring non-/acceptance of deactivation of the candidate beam from the at least one target radio access entity on the basis of the load balancing hypothesis, and an operation (S140) of deactivating the candidate beam if acceptance of deactivation of the candidate beam is inquired from the at least one target radio access entity.

Figure 2:
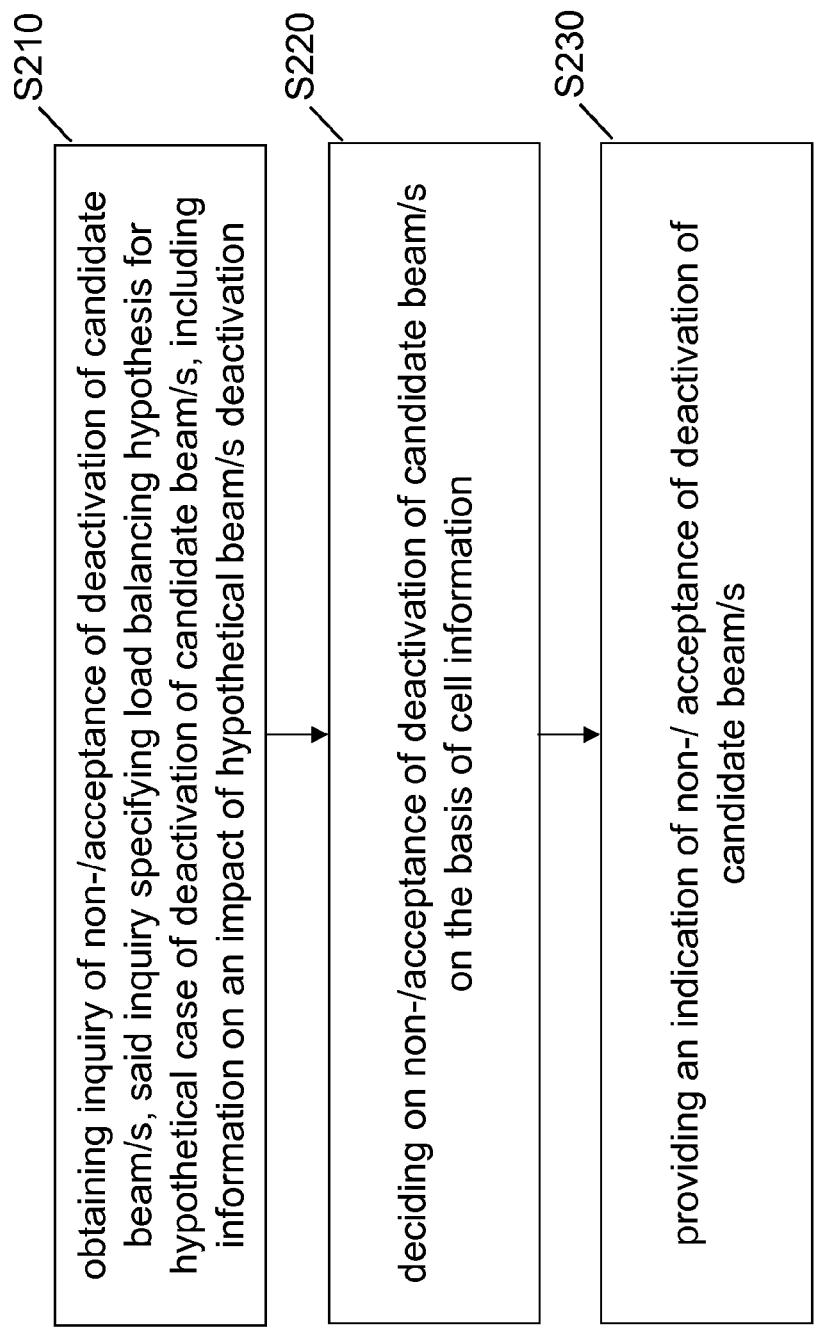
FIG. 2 shows a flowchart illustrating an example of a method, which is operable at or by a radio access entity acting as/in a target cell of load balancing, according to at least one exemplifying embodiment.

FIG. 2 shows a flowchart illustrating an example of a method, which is operable at or by a radio access entity acting as/in a target cell of load balancing (i.e. a non-overloaded cell), according to at least one exemplifying embodiment. The method of FIG. 2 can be performed/executed e.g. by a gNB of a 5G/NR system, representing a radio access entity which employs beamforming for providing radio access, i.e. a plurality of beams for providing/achieving cell coverage. For example, the method of FIG. 2 can be performed/executed by Cell B or its radio access entity, as illustrated in any one of FIGS. 3 and 4.

As shown in FIG. 2, a method according to at least one exemplifying embodiment comprises an operation (S210) of obtaining an inquiry of non-/acceptance of deactivation of a candidate beam, which is at least one beam of beams providing beamformed radio access, from a source radio access entity (i.e. a radio access entity, such as another gNB of a 5G/NR system, acting as/in a (neighboring) source cell of load balancing (i.e. an overloaded cell), said inquiry specifying a load balancing hypothesis for a hypothetical case of deactivation of the candidate beam, including information on an impact of the hypothetical beam deactivation with respect to terminal entities being currently served by the candidate beam by offloading to the radio access entity, an operation (S220) of deciding on non-/acceptance of deactivation of the candidate beam on the basis of cell information of a cell of the radio access entity, including at least information on a load in the cell of the radio access entity, and an operation (S230) of providing, to the source radio access entity, an indication of non-/acceptance of deactivation of the candidate beam as a deciding result.

It is to be noted that the radio access entity performing/executing the method of FIG. 1 may represent the source radio access entity in the method of FIG. 2, and the radio access entity performing/executing the method of FIG. 2 may represent the target radio access entity in the method of FIG. 1.

As outlined above, an evaluation of the hypothetical case of deactivation of the at least one candidate beam is accomplished (by operations S120 and S130 of FIG. 1 and operations S210 to S230 of FIG. 2), and the result of such evaluation is taken as a basis for a beam deactivation decision. Accordingly, the beam deactivation decision is taken at/by the source radio access entity cooperatively (by negotiation/agreement with the at least one target radio access entity).

In the following, illustrative examples of scenarios and realizations of the load balancing technique, as illustrated by FIGS. 1 and 2, are described with reference to FIGS. 3 and 4. The applicability of the technique of the present disclosure is not limited to any particular beam number and/or configuration, as used hereinafter for illustrative purposes.

In the thus illustrated examples, a description is given for a case, as a basic yet non-limiting assumption for illustrative purposes, that both the load balancing source cell and the load balancing target cell/s use beamforming so as to provide beamformed radio access. As mentioned above, this represents a non-limiting example scenario only, and the technique of the present disclosure, as exemplified below, equally works when the load balancing target cell/s do not use beamforming (in which case any references to plural beams of the target cell/s are to be understood/read as referring to the single radiation/beam of the target cell/s). Also, and the technique of the present disclosure, as exemplified below, equally works when the load balancing target cell/s use another type of beamforming, another number of beams, or the like, as compared with the load balancing source cell.

Figure 3:
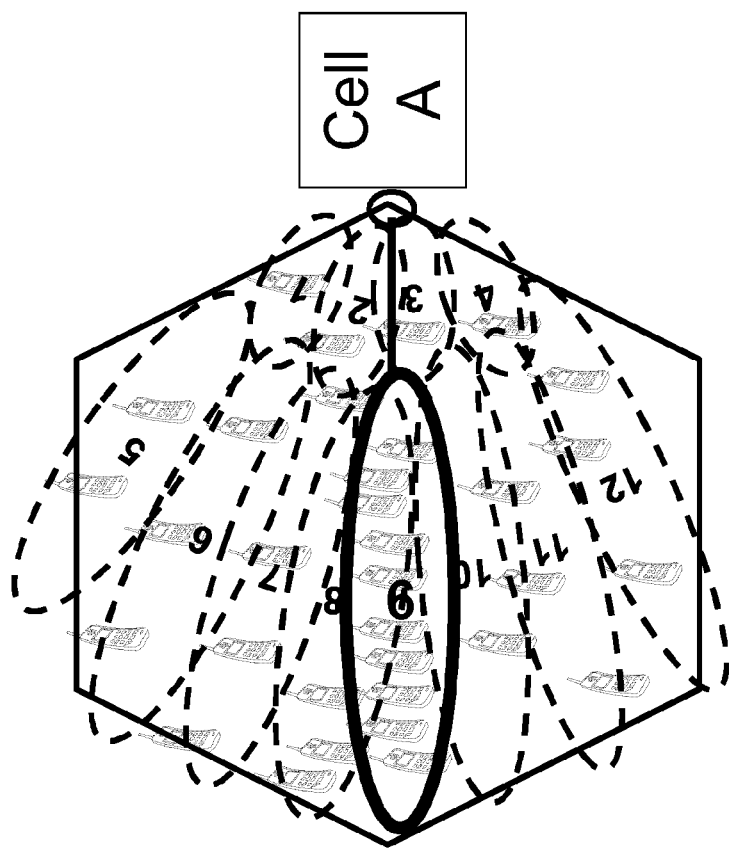
FIG. 3 shows a schematic diagram of an example of a load balancing scenario according to at least one exemplifying embodiment.
Figure 3:
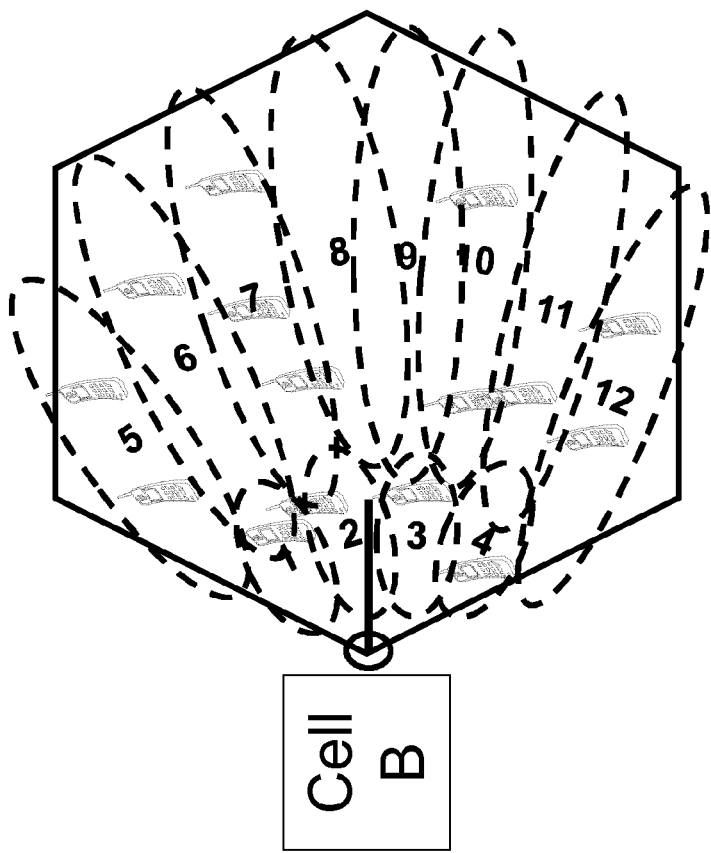

FIG. 3 shows a schematic diagram of an example of a load balancing scenario according to at least one exemplifying embodiment.

As shown in FIG. 3, the exemplary scenario shows two neighboring cells, namely Cell A and Cell B. While in real systems any cell typically has more than one neighboring cell, a scenario with only two cells is given for the sake of simplicity. In the exemplary scenario, both Cell A and Cell B, i.e. their respective radio access entities (e.g. gNBs), employ (any kind of) beamforming for providing radio access, i.e. provide/achieve cell coverage or serve users (i.e. UEs) by a plurality of beams. As an example, it is assumed that both Cell A and Cell B serve users (i.e. UEs) by means of 12 beams (namely, 4 inner beams denoted by #1 to #4 and 8 outer beams denoted by #5 to #12), respectively.

It is to be noted that the frequencies or frequency bands utilized in Cell A and Cell B can be the same or different, and the load balancing technique according to the present disclosure is applicable for any frequency or frequency band configuration. Irrespective thereof, it is to be noted that the load balancing technique according to the present disclosure is particularly useful and beneficial for load balancing between cells of the same carrier frequency ("intra-frequency load balancing") where interference between the cells is the dominant limitation of the load balancing effect. In contrast thereto, load balancing between cells of different carrier frequencies ("inter-frequency LB") does not have this interference problem, but can balance the load across the frequency, besides a given area.

As shown in FIG. 3, it is assumed that Cell A is highly loaded, most of the users (i.e. UEs) being served by beam #9, and the load in neighboring Cell B is significantly lower, namely less users (i.e. UEs) are served by Cell B than by Cell A.

Cell A (e.g. its gNB) can read from existing load information via X2/Xn that Cell B has spare capacity, and thus may consider LB actions towards this cell. Namely, Cell A may consider offloading users (i.e. UEs) to Cell B.

Cell A (e.g. its gNB) can identify beam #9 as a candidate beam for offloading users (i.e. UEs) being currently served thereby, since beam #9 is the most crowded beam and thus has the potential to provide the most significant load reduction in Cell A. Hence, Cell A (e.g. its gNB) can identify one or more beams with a highest number of served terminal entities and/or a highest load in its cell as the candidate beam for load balancing. Thereby, as many UEs as possible are (tried to be) are moved away from Cell A to Cell B.

Cell A (e.g. its gNB) can deactivate, i.e. switch off, beam #9 representing the candidate beam. As a result, users (i.e. UEs) previously served by beam #9 will connect to other beams in Cell A or to Cell B, such as e.g. beam #9 in Cell B. The target beam in the target cell can be any beam thereof, and will typically be the beam which is seen strongest by the offloaded UEs, respectively. This means that these users (i.e. UEs) will connect to less optimal beam/s in Cell B (as compared to their current beam in Cell A) which may result in a decrease in their experienced SNR/SINR. However, unlike legacy load balancing mechanisms (i.e. by tuning the Tx power or changing handover conditions), the SNR/SINR of the other users remaining in Cell A will not be impacted. Furthermore, unlike legacy load balancing mechanisms (i.e. by tuning the Tx power or changing handover conditions), the users which are offloaded to Cell B will not suffer from massive/severe SNR/SINR degradation and no (significant) interference, since (e.g. beam #9 in) Cell B provides the strongest signal due to deactivation of beam #9 in Cell A.

Accordingly, the load balancing technique according to the present disclosure exploits the spatial granularity of the beams in neighboring cells or at least the load balancing source cell of the neighboring cells (one of them being highly loaded and at least another one of the them having spare capacity) to offload users from at least one beam in the highly loaded cell to at least one beam in the at least one spare-capacity neighboring cell. Hence, by deactivation of candidate beam/s in the overloaded cell, the natural cell boundary (defined by the strongest cell or its strongest beam) is locally moved (i.e. only for the deactivated candidate beam/s) towards the overloaded cell.

It is to be noted that deactivation of candidate beam/s in the overloaded cell is preferably implemented upon acceptance/agreement of such beam/s deactivation by Cell B (e.g. its gNB) via X2/Xn signaling. Namely, it is preferable and beneficial that such beam/s deactivation in the overloaded cell takes place only upon a corresponding negotiation (with positive/affirmative result) between Cell A (e.g. its gNB) and Cell B (e.g. its gNB). Such negotiation is explained below with reference to FIG. 4.

It is to be noted that deactivation of one (or a small number) of 12 beams in Cell A is very unlikely to create a coverage hole, i.e. a situation in which there is no coverage neither from the current/source cell nor the neighboring/target cell or, stated in other words, a situation in which users (i.e. UEs) previously served by the then deactivated beam/s are no longer served or, stated in other words, an area arises in which no coverage is provided/achieved by any radio access entity (or, in the case of beamforming radio access, any radio access beam). However, since Cell A then has lower load and only has to schedule 11 beams (or a bit less), the scheduling delay of each of these beams, and the users served thereby, will decrease, and also throughput will increase.

It is to be noted that, as the total resources of the cell are distributed to the active beams, deactivation of beam #9 in Cell A does not reduce the capacity of Cell A, at least not for analog beamforming where only one (or few) beams are used at the same time. Even for fully digital beamforming, it is not likely to use 12-dimensional multi-user MIMO (i.e. using 12 beams simultaneously) due to intra-cell interference, and thus taking out one or a few beams does not, at least not necessarily, reduce the capacity in the overloaded cell.

It is to be noted that the offloading of users (i.e. UEs) from the overloaded cell can take place towards one or more neighboring (non-overloaded) cells, which are preferably neighboring cells of the overloaded cell. Namely, if there are plural neighboring cells having spare capacity (instead of only Cell B as exemplified in FIG. 3), the user (i.e. UEs) being offloaded from Cell A due to beam/s deactivation can be transferred to or taken over by plural neighboring cells such that the load thereof is distributed accordingly. Such load distribution between plural target cells can be determined by their respective loads, radio access conditions (e.g. beam characteristics), acceptance/agreement indications, or the like.

Figure 4:
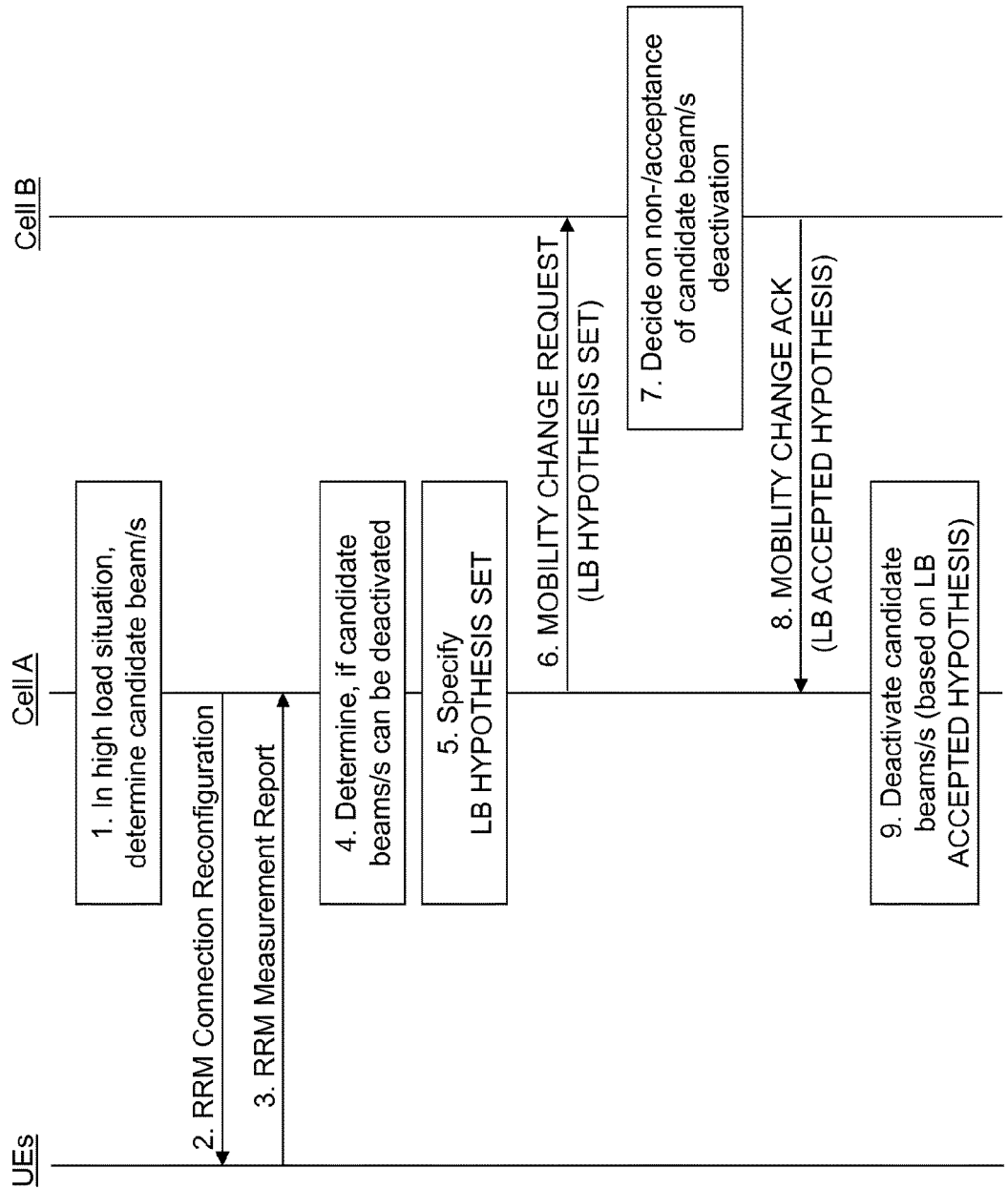
FIG. 4 shows a sequence diagram illustrating an example of a process according to at least one exemplifying embodiment.

FIG. 4 shows a sequence diagram illustrating an example of a process according to at least one exemplifying embodiment. For example, Cell A represents an overloaded cell and may correspond to Cell A or its radio access entity (e.g. gNB) in FIG. 3, Cell B represents a non-overloaded cell and may correspond to Cell B or its radio access entity (e.g. gNB) in FIG. 3, and UEs represents one or more terminal entities being currently served by at least one beam in Cell A and may correspond to the UEs served by beam #9 in FIG. 3.

When reference is made to a Cell A/B hereinafter, this may equally mean the cell as such or its radio access entity, e.g. gNB, respectively.

In step 1, Cell A determines a load balancing condition. When Cell A finds itself in a high-load situation, and when load information indicates that at least one neighboring cell (in the present example, Cell B) has spare capacity, Cell A will determines whether load balancing is effective and should thus be performed Namely, Cell A determines whether deactivating (i.e. switching off) a certain set of beams, i.e. one or more beams providing beamformed radio access, would cause UEs to hand over to that at least one neighboring cell with spare capacity, thereby creating offloading benefits. In this regard, Cell A identifies the beam/s to be deactivated and the target cell for offloading UEs of the thus identified candidate beam (which represents a set of one or more beams). In the example of FIG. 3, it is most reasonable to switch off beam #9, which is the most crowded beam that is currently serving the highest number of users, and to identify Cell B as the target cell.

As a basis for step 1 or in step 1, Cell A may identify a load balancing situation in which the load in Cell A is high and the load in Cell B is low (i.e. load conditions on cell level), and/or may identify Cell B as the at least one target radio access entity. Specifically, when plural neighboring cells are available, Cell A may decide which one or ones of them is a suitable target cell candidate, which may be based e.g. on load conditions in the neighboring cells, or the like.

Then, Cell A will specify a load balancing hypothesis for a hypothetical case of deactivation of the identified candidate beam, as basis for negotiation with the identified target cell. In this regard, Cell A acquires information on number and characteristics of the UEs, i.e. the users or terminal entities being currently served by the candidate beam, and specifies the load balancing hypothesis based on the thus acquired information.

In step 2, Cell A configures the UEs severed by beam #9 e.g. via a dedicated RRM Connection Reconfiguration message to provide RSRP and/or RSRQ measurements of beams in Cell A and Cell B. Thereupon, the UEs perform the configured measurement and provide measurement reports to Cell A. In step 3, Cell A receives these measurement reports e.g. via a dedicated RRM Measurement report message.

Accordingly, Cell A retrieves results of RRM measurements with respect to one or more beams in Cell A and Cell B for the UEs being currently served by beam #9 of Cell A. For example, these RRM measurements can be used for evaluating potential generation of a coverage hole and for approximating the number and characteristics of UEs that will be pushed to Cell B in case of switching off the candidate beam.

In step 4, Cell A determines if beam #9 (as an example of the candidate beam) can be switched off without causing a coverage hole based on the received measurement reports from the UEs. Namely, Cell A determines whether the UEs currently served by beam #9 can find a new beam to connect to (i.e. to be served by) with a decent quality when beam #9 is switched off, i.e. whether the UEs currently served by beam #9 can be successfully offloaded to Cell B.

Accordingly, Cell A evaluates whether or not a coverage hole for one or more of the UEs being currently served by the candidate beam is caused when deactivating the candidate beam based on the retrieved RRM measurements results. If it is evaluated that a coverage hole is caused for any one of the UEs when switching off the candidate beam, the process is aborted, i.e. no load balancing will be performed, or appropriate countermeasures are taken. If it is evaluated that no coverage hole is caused for any one of the UEs when switching off the candidate beam, the process is continued by specifying the load balancing hypothesis.

In step 5, Cell A specifies the load balancing hypothesis for the hypothetical case of deactivation of the candidate beam. The load balancing hypothesis includes information on an impact of the hypothetical beam deactivation with respect to the UEs by offloading to Cell B. The load balancing hypothesis may be constructed in a dedicated way per cell pair, in this case by Cell A for Cell B, and may include several items (herein referred to as LB Hypothesis Set items), each corresponding to one potential set of beams to be switched off by Cell A (i.e. one candidate beam).

Namely, Cell A sets the information on the impact of the hypothetical beam deactivation, in the load balancing hypothesis, with respect to the UEs based on the received RRM measurements results and/or characteristic information regarding operation/performance and/or service provisioning in Cell A. To this end, besides retrieving the RRM measurements results, Cell A also retrieves such characteristic information regarding operation/performance and/or service provisioning in Cell A, which may include or relate to e.g. present/guaranteed quality of service, present/used network slice, or the like of each UE to be transferred to Cell B.

For example, a LB Hypothesis Set Item (for a respective set of beams or candidate beam) may encode: the beam IDs at Cell A of the potential beams to be switched off, the number of UEs that are expected to be handed over to Cell B if Cell A switches off the selected beams, their 5QI and slice ID. Additionally, the ID of beams in Cell B (if present), to which the UEs that are expected to be handed over to Cell B will most likely connect to and thus be served by, and their projected signal quality indication, such as e.g. SNR, SINR, RSRP, RSRQ, etc., can be also included. Such information can be derived by Cell A e.g. from reported measurements from the UEs.

Then, Cell A negotiates with Cell B about non-/acceptance of deactivation of the candidate beam according to the specified load balancing hypothesis, i.e. the individual items thereof. Namely, Cell A inquires non-/acceptance of deactivation of the candidate beam from Cell B on the basis of the specified load balancing hypothesis.

In step 6, Cell A issues and Cell B obtains a corresponding request message to Cell B. In the illustrated example, Cell A sends a MOBILITY CHANGE REQUEST message (including a dedicated information element, herein referred to as LB HYPOTHESIS SET) about desired/hypothetical beam deactivation over X2/Xn to Cell B. The LB HYPOTHESIS SET, i.e. the load balancing hypothesis, indicates or defines the benefit of the desired/hypothetical beam deactivation for Cell A and its impact for Cell B. As indicated above, the LB HYPOTHESIS SET contains a LB Hypothesis Set Item for each beam to be hypothetically switched off. Specifically, Cell A informs Cell B about desired/hypothetical switching off for each candidate beam.

An example of a possible implementation of LB HYPOTHESIS SET in ASN.1 code is given below, wherein 'sending node' refers to Cell A and 'receiving node' refers to Cell B.

| LB Hypothesis Set Item | | 1 ... <maxnoofLBHypotesisitems> | | |
|---|---|---|---|---|
| >beamIdOff | M | 1 | INT | ID of beam in the sending node to be switched off |
| >NoUEtobeTransfered | M | | INT | The number of UEs that are expected to be handed over from sending node to receiving node if once beamIdOff is switched off |
| >ue5qi | M | 1 ... size<NoUEtobeTransfered> | BIT STRING | Each bit in the bitmap encodes the 5QI of the transferred UEs |
| > sliceid | M | 1 ... size<NoUEtobeTransfered> | BIT STRING | Each bit in the bitmap encodes the slice identifier of the transferred UEs |
| >targetbeamids | O | | INT | Beam ids of the receiving node where the transferred UEs can be excepted to handover |
| >projectedSINR | O | 1 ... size<noNoUEtobeTransfered> | INT | SINR projections for each of the transferred UEs |

In this possible implementation, the given field and the indication of fields as mandatory (M) and option (O) merely represent a non-limiting example for illustrative purpose. While a beam identifier of the beam subject to desired/hypothetical beam deactivation shall be included, the potential benefit/impact of the desired/hypothetical beam deactivation can be indicated or defined in any feasible manner. For example, the information on the potential benefit/impact can include one or more of a number of terminal entities expected to be offloaded (such as e.g. NoUEtobeTransfered above), a quality-of-service indicator of each terminal entity expected to be offloaded (such as e.g. ue5qi above), a network slice identifier of each terminal entity expected to be offloaded (such as e.g. sliceid above), at least one beam identifier of at least one beam for serving terminal entities expected to be offloaded (such as e.g. targetbeamids above), and at least one projected signal/noise-related ratio of each terminal entity expected to be offloaded (such as e.g. projectedSINR above). If Cell B does not use beamforming, the attribute-value pair of targetbeamids is not required/included. The attribute-value pair projectedSINR is merely an example for any kind of projected signal quality indication.

In step 7, upon obtaining the inquiry of non-/acceptance of the desired/hypothetical beam deactivation from Cell A in step 6, Cell B decides on non-/acceptance of the desired/ hypothetical beam deactivation on the basis of cell information of Cell B, including at least information on a load in Cell B. Namely, Cell B decides which (if any) of the desired/hypothetical deactivations of the one or more candidate beams, as inquired in/by LB HYPOTHESIS SET, to accept. Such decision, which can be made per beam (i.e. per inquired hypothetical beam deactivation), can be based, besides its own load levels, on SLAs of served users, information received from Cell A, or the like. For example, Cell B can base the decision or at least consider in the decision on whether or not (or, if so, to which extent), slice availability and/or SLA fulfilment can be ensured for the UEs expected to be handed over to Cell B, i.e. the current situation of the network and/or the service characteristics of the UEs in question.

In step 8, Cell B issues and Cell A obtains a corresponding request message from Cell B. In the illustrated example, Cell A receives a response message in the form of a MOBILITY CHANGE ACKNOWLEDGE message (including a dedicated information element, herein referred to as LB ACCEPTED HYPOTHESIS), in the case of acceptance of the desired/hypothetical beam deactivation in Cell A by Cell B. Specifically, Cell B informs Cell A about acceptance of the desired/hypothetical beam deactivation for any corresponding item, i.e. each LB Hypothesis Set Item. That is, LB ACCEPTED HYPOTHESIS contains or represents an acceptance indication for each beam to be hypothetically switched off (corresponding to a respective LB Hypothesis Set Item) which is accepted/agreed by Cell B.

In the case of non-acceptance of any desired/hypothetical beam deactivation by Cell B, Cell A obtains receives a failure message, e.g. in the form of a MOBILITY CHANGE FAILURE message (including a dedicated information element, herein referred to as LB HYPOTHESIS REJECT, being set to TRUE). Specifically, Cell B informs Cell A about non-acceptance of the desired/hypothetical beam deactivation for any corresponding inquired item, i.e. each LB Hypothesis Set Item. That is, LB HYPOTHESIS REJECT being set to TREU contains or represents a non-acceptance indication for each beam to be hypothetically switched off (corresponding to a respective LB Hypothesis Set Item) which is not accepted/agreed by Cell B.

It is to be noted that different messages (with different information elements) are exemplified for the example of FIG. 4 for informing Cell A about non-/acceptance of the desired/hypothetical beam deactivation, but this is merely an illustrative example. It is however also possible that Cell B provides such information in a common/single message for all of the inquired candidate beams, including respective (information elements with corresponding) indications of acceptance or non-acceptance per candidate beam. For example, if non-/acceptance of desired/hypothetical beam deactivation for beams #9 and #12 of Cell A is inquired, Cell B may device to accept deactivation of beam #9 in Cell A but refrain acceptance for beam #12 in Cell A, and may inform Cell A accordingly (with an indication corresponding to LB ACCEPTED HYPOTHESIS for beam #9 and an indication corresponding to LB HYPOTHESIS REJECT being set to TRUE for beam #12).

In step 9, Cell A implements deactivation, i.e. switching off, of the candidate beam, i.e. one or more of the inquired beams according to the desired/hypothetical beam deactivation, corresponding to the acceptance by/from cell B.

Namely, Cell A deactivates the candidate beam if acceptance of deactivation of the candidate beam is inquired from Cell B (i.e. the beam/s being approved e.g. by LB ACCEPTED HYPOTHESIS), but Cell A does not deactivate the candidate beam if non-acceptance of deactivation of the candidate beam is inquired from Cell B (i.e. the beam/s being refused e.g. by LB HYPOTHESIS REJECT).

It is to be noted that the above description of the example of FIGS. 3 and 4 may relate to a single candidate beam and a single target cell for load balancing or offloading, but the present disclosure is also applicable for multiple candidate beams and/or multiple target cells for load balancing or offloading in equal measure. With multiple candidate beams and/or target cells, the same or different inquiries regarding various candidate beams may be issued to various target cells, and offloading can be effected to the (most suitable) target cell accepting a respective inquiry. For example, if beams #9 and #12 represent candidate beams, an inquiry regarding beam #9 can be issued to a first target cell and an inquiry regarding beam #12 can be issued to a second target cell (and possible even a third target cell).

Although not shown in FIG. 4, the process may additionally comprise (an option of) acquiring cell information of Cell B at/by Cell A, deciding on non-/acceptance of deactivation of the candidate beam for the Cell B on the basis of the acquired cell information at/by Cell A, and deactivating the candidate beam if acceptance of deactivation of the candidate beam is decided for Cell B at/by Cell A. In this regard, the cell information of Cell B may include at least information on the load in Cell B, and may additionally include information regarding operation/performance and/or service provisioning of UEs being served in Cell B.

Accordingly, in one instance, steps 6 to 8 in FIG. 4 could be replaced by a corresponding procedure where Cell A decides on its own (e.g. based purely on load information previously received from Cell B) if it can switch off the candidate beam and if the consequences would be acceptable for Cell B. This is based on the premise that neighboring cells (i.e. gNBs) can inform each other on a configurable basis (e.g. periodic, event based, etc.) about their load levels via the RESOURCE STATUS REQUEST/RESPONSE/UPDATE messages, and this knowledge of Cell B can be used by Cell A.

Such option can be used as a backup operation, in which Cell A autonomously decides on the desired/hypothetical beam deactivation, in case there is currently no connection (over the X2/Xn interface) to Cell B.

However, it is preferable that the desired/hypothetical beam deactivation is based on a negotiation between Cell A and Cell B about non-/acceptance of deactivation of the candidate beam by Cell B. By signaling and negotiating the desired/hypothetical beam deactivation (together with its effects, i.e. the benefit/impact to be expected thereby), Cell B gets the chance to decide if and what load it can (or wants to) accept from Cell A. Thereby, it can be ensured that shifting of load to Cell B will not create overload there which may then cause Cell B to take load balancing measures, thus leading to re-shafting of load back to Cell A. Also, other aspects, like slice availability and SLA fulfilment at Cell B, can be ensured by signaling and negotiating the desired/hypothetical beam deactivation (together with its effects, i.e. the benefit/impact to be expected thereby), i.e. by providing detailed information on the characteristics of the UEs (desired) to be handed over from Cell A to Cell B.

Figure 5:
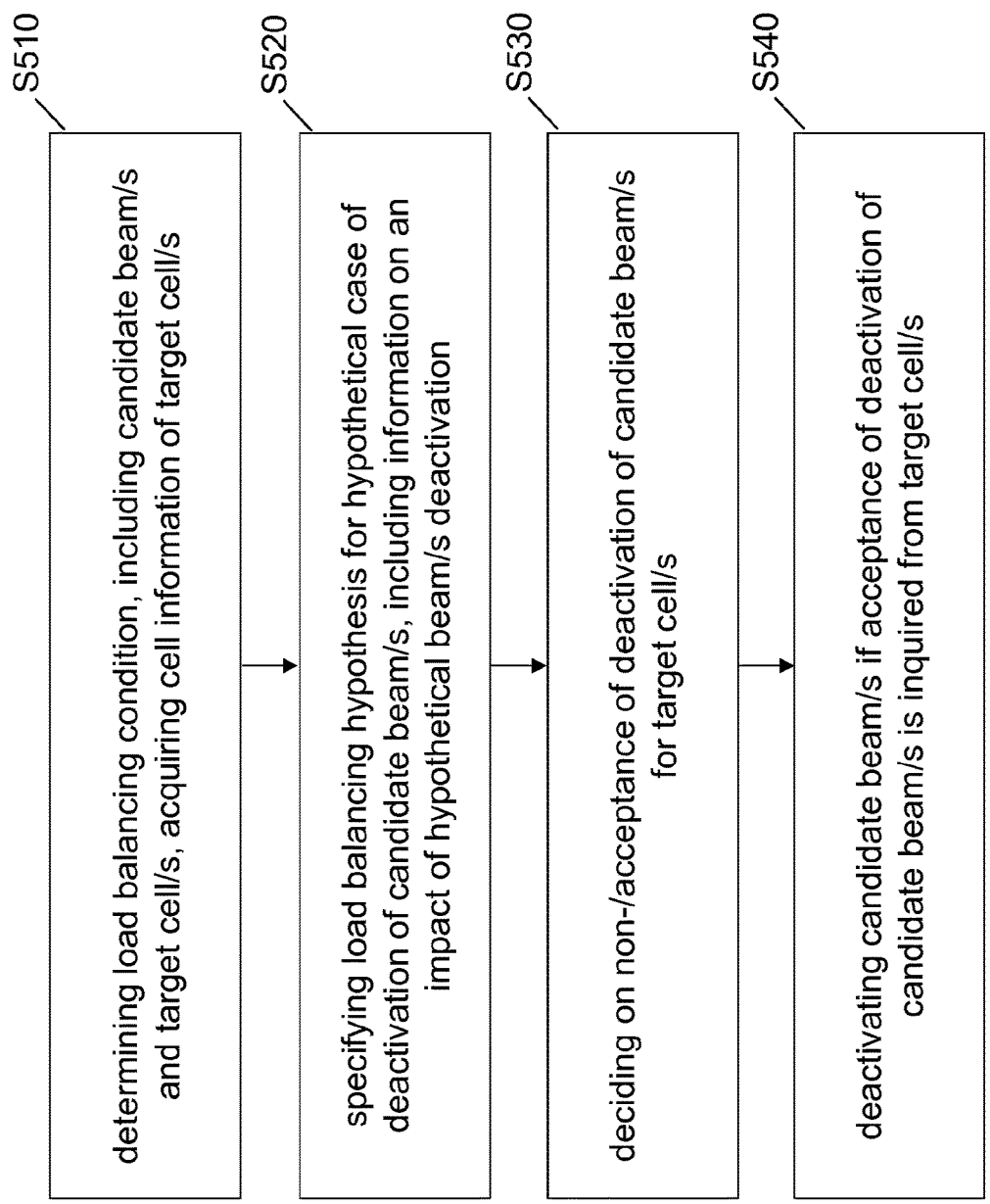
FIG. 5 shows a flowchart illustrating another example of a method, which is operable at or by a radio access entity acting as/in a source cell of load balancing, according to at least one exemplifying embodiment.

FIG. 5 shows a flowchart illustrating another example of a method, which is operable at or by a radio access entity acting as/in a source cell of load balancing, according to at least one exemplifying embodiment.

FIG. 5 shows a flowchart illustrating another example of a method, which is operable at or by a radio access entity acting as/in a source cell of load balancing (i.e. an overloaded cell), according to at least one exemplifying embodiment. The method of FIG. 5 can be performed/executed e.g. by a gNB of a 5G/NR system, representing a radio access entity which employs beamforming for providing radio access, i.e. a plurality of beams for providing/achieving cell coverage.

As shown in FIG. 5, a method according to at least one exemplifying embodiment comprises an operation (S510) of determining a load balancing condition, including at least one beam of beams providing beamformed radio access as a candidate beam and at least one target radio access entity (i.e. a radio access entity, such as another gNB of a 5G/NR system, acting as/in a (neighboring) target cell of load balancing (i.e. a non-overloaded cell) for offloading terminal entities being currently served by the candidate beam, and acquiring cell information of the at least one target cell of the at least one target radio access entity, including at least information on a load in the at least one target cell of the at least one target radio access entity, an operation (S520) of specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, an operation (S530) of deciding on non-/acceptance of deactivation of the candidate beam for the at least one target radio access entity on the basis of the acquired cell information, and an operation (S540) of deactivating the candidate beam if acceptance of deactivation of the candidate beam is decided for the at least one target radio access entity.

It is to be noted that the acquisition of cell information of the target cell/s is exemplified as part of the determination of the load balancing condition in FIG. 5, but this is merely a non-limiting illustration. The acquisition of cell information of the target cell/s can also be accomplished before or after the determination of the load balancing condition, e.g. before operation S510, before or concurrently with operation S520 or before operation S530 in FIG. 5.

It is to be noted that the method of FIG. 5 may additionally comprise an operation of evaluating whether or not a coverage hole for one or more of the terminal entities being currently served by the candidate beam is caused when deactivating the candidate beam, which can be based on retrieved radio resource management measurements results. Based thereon, the load balancing hypothesis may be specified if it is evaluated that a coverage hole is not caused for any one of the terminal entities being currently served by the candidate beam when deactivating the candidate beam. Such functionality is equivalent to that described in step 4 of FIG. 4 above, and reference is made thereto for further details.

As regards examples of scenarios and realizations of the load balancing technique, as illustrated by FIG. 5, reference is made to the description of FIGS. 3 and 4 above. Namely, any details regarding potential scenarios and realizations, which are applicable for the teaching of FIGS. 3 and 4, are applicable for the teaching of FIG. 5 accordingly, as far as employable or relevant.

As outlined above, an evaluation of the hypothetical case of deactivation of the at least one candidate beam is accomplished (by operations S520 and S530 of FIG. 5), and the result of such evaluation is taken as a basis for a beam deactivation decision. Accordingly, the beam deactivation decision is taken at/by the source radio access entity autonomously.

By virtue of exemplifying embodiments of the present disclosure, as evident from the above, load balancing between neighboring cells in a system with beamformed radio access can be enabled/realized. Namely, load balancing measures/mechanisms are provided, which are suitable/effective for a system providing/achieving cell coverage using beamforming, i.e. a plurality of beams, while overcoming or at least mitigating deficiencies of legacy load balancing mechanisms.

As explained above, the load balancing technique of the present disclosure is a (cell-level) mechanism for load balancing, which is applicable in 5G/NR systems employing beamformed radio access, via beam deactivation. Accordingly, the present disclosure can also be regarded as a mechanism for joint and adaptive beam configuration between neighboring cells, for the purpose of load balancing there-between. By way of beam deactivation, advantage can be taken of the flexibility offered by the new dimension of beams (in systems employing beamformed radio access) which offer more granularity to decrease interference.

Specifically, it is described that an overloaded cell switches off selected crowded beam/s in order to force users to connect (or to handover) to less crowded neighboring cell/s. This will increase the user throughputs and decrease the scheduling delay per beam for the remaining users (i.e. UEs), without leading to interference problems for the handed over users (i.e. UEs) like in legacy load balancing mechanisms. This will have a positive effect on the quality of service experienced by the users (i.e. UEs). Further, it is described that a negotiation of the desired changes between the overloaded cell and its neighbor cell/s, to which some of the load should be shifted, may be performed prior to beam deactivation. In this regard, the overloaded cell may provide to the neighboring cell one or multiple hypotheses including impact information such as predictions of future SINR/load in the neighboring cell/s for the hypothetical case that it switches off selected crowded beam/s. Only if agreed, changes according to the requested and agreed hypotheses will be implemented by the overloaded cell. It is to be noted that sudden and autonomous deactivation of one or more beams in the overloaded cell may create massive damages to neighboring cell/s, and such preceding negotiation is useful to give the neighboring cell/s the chance to veto changes when its/their expected damage is (deemed to be) too large. The impact information can be considered as a benefit metric which can be used (potentially together with target beam and/or SNR/SINR predictions) by the neighboring cell/s to evaluate the costs against the benefits for accepting the requested changes or a subset thereof, i.e. for accepting deactivation of one or more beams in the overloaded cell and the associated offloading of users (i.e. UEs) previously served by the thus deactivated beam/s to the neighboring cell/s.

As explained above, the load balancing technique of the present disclosure, by utilizing beam deactivation, is advantageous over legacy load balancing mechanisms in that the users (i.e. UEs) that are targeted for load balancing and are transferred to the non-overloaded cell will not suffer from interference of the previously serving beam while the users (i.e. UEs) that are not targeted for load balancing and are left in the overloaded cell are not impacted. By deactivating the selected beam/s, the overloaded cell can improve user throughput and latency for the users (i.e. UEs) that are left in the overloaded cell. The users (i.e. UEs) that are transferred to the non-overloaded cell can also experience gains in throughput as the target cell is less crowded.

With the load balancing technique of the present disclosure, the spatial granularity of beams (which comes along with usage of beamforming for providing radio access) can be exploited to move the natural cell boundary towards the overloaded cell by deactivating one or more beams in the overloaded cell. Thereby, benefits can be achieved even for intra-frequency load balancing, which are rather limited in beamless systems (due to interference problems). That is to say, the load balancing technique of the present disclosure can overcome or at least mitigate interference problems prevailing in legacy load balancing mechanisms for beamless systems.

While the load balancing technique of the present disclosure is equally applicable for both intra-frequency load balancing and inter-frequency load balancing, it is particularly beneficial and effective for intra-frequency load balancing between cells of the same carrier frequency or frequency band where interference between the cells is the dominant limitation of the load balancing effect.

As explained above, the load balancing technique of the present disclosure, by utilizing negotiation via hypotheses between two cells prior to implementing beam deactivation, is advantageous over legacy load balancing mechanisms by ensuring that load is not just shifted back and forth between the two cells and ensuring service continuity and SLA fulfilment for the impacted users, i.e. the users (i.e. UEs) that are transferred to the non-overloaded cell.

With the load balancing technique of the present disclosure, an adaptive approach is provided, in which the current situation of the network, i.e. how many users (i.e. UEs) are served by which cell/beam and how many users (i.e. UEs) are to be handed over as well as their service characteristics can be taken into account. The source cell knows and includes information regarding specific users (i.e. UEs) that are expected to show up in the target cell and the impact they would cause (e.g. the number of UEs that are expected to be handed over, their 5QI, their slice ID, the ID of beams in Cell B they will most likely connect to and their projected signal quality indication e.g. SINR). This gives the target cell a change to asses if it can/wants accept them or not, or to which extent.

The above-described methods, procedures and functions may be implemented by respective functional elements, entities, modules, units, processors, or the like, as described below.

While in the foregoing exemplifying embodiments of the present invention are described mainly with reference to methods, procedures and functions, corresponding exemplifying embodiments of the present invention also cover respective apparatuses, entities, modules, units, network nodes and/or systems, including both software and/or hardware thereof.

Respective exemplifying embodiments of the present invention are described below referring to FIGS. 6 and 7, while for the sake of brevity reference is made to the detailed description of respective corresponding configurations/set-ups, schemes, methods and functionality, principles and operations according to FIGS. 1 to 5.

Figure 6:
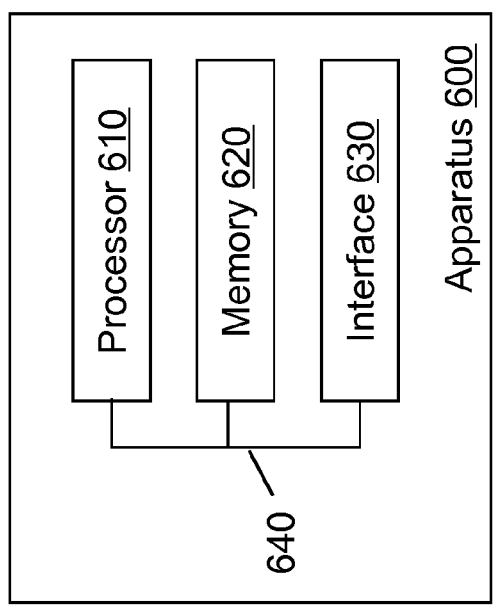
FIG. 6 shows a schematic diagram illustrating an example of a (constructional) structure of apparatuses according to at least one exemplifying embodiment.
Figure 7:
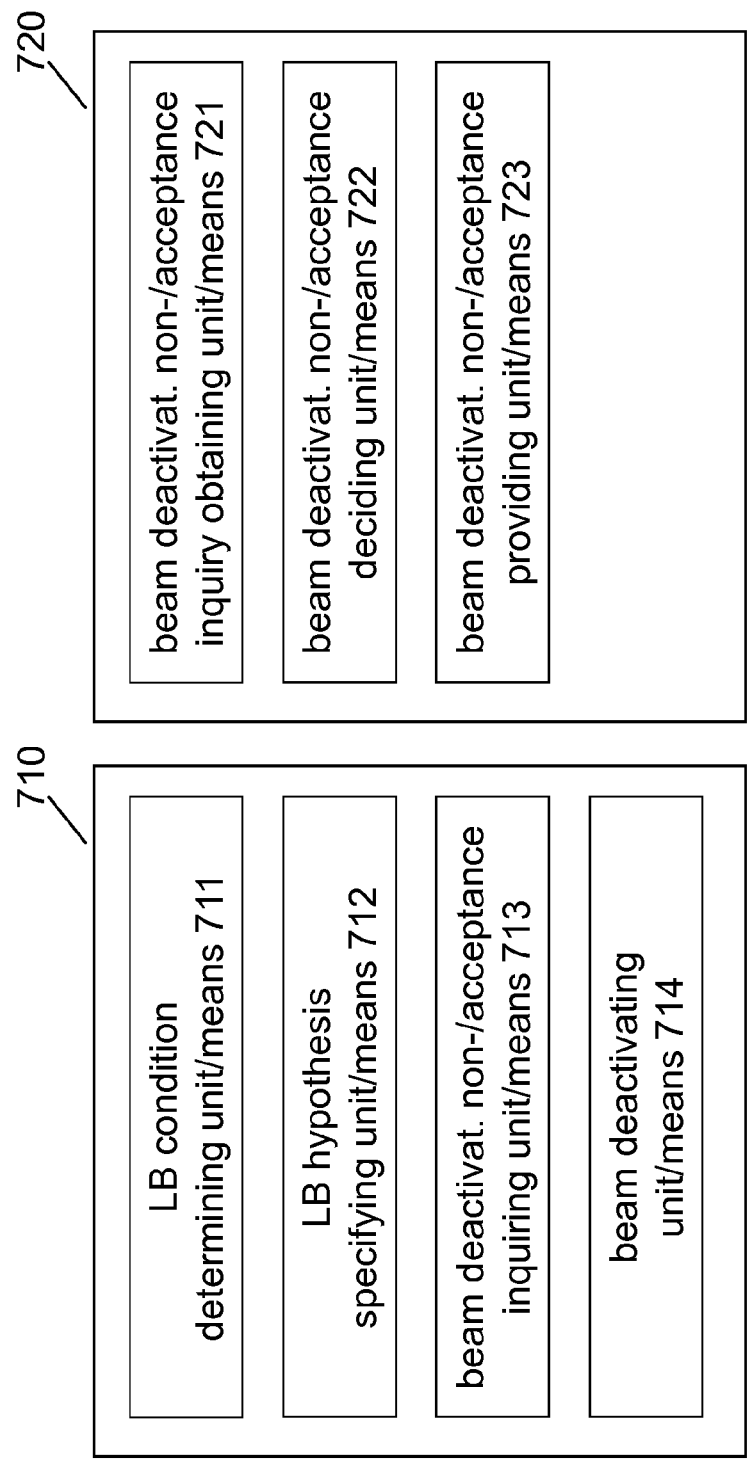
FIG. 7 shows a schematic diagram illustrating an example of a (functional) structure of apparatuses according to at least one exemplifying embodiment.

In FIGS. 6 and 7, the blocks are basically configured to perform respective methods, procedures and/or functions as described above. The entirety of blocks are basically configured to perform the methods, procedures and/or functions as described above, respectively. With respect to FIGS. 6 and 7, it is to be noted that the individual blocks are meant to illustrate respective functional blocks implementing a respective function, process or procedure, respectively. Such functional blocks are implementation-independent, i.e. may be implemented by means of any kind of hardware or software or combination thereof, respectively.

Further, in FIGS. 6 and 7, only those functional blocks are illustrated, which relate to any one of the above-described methods, procedures and/or functions. A skilled person will acknowledge the presence of any other conventional functional blocks required for an operation of respective structural arrangements, such as e.g. a power supply, a central processing unit, respective memories or the like. Among others, one or more memories are provided for storing programs or program instructions for controlling or enabling the individual functional entities or any combination thereof to operate as described herein in relation to exemplifying embodiments.

As indicated in FIG. 6, according to exemplifying embodiments of the present invention, an apparatus 600 may comprise at least one processor 610 and at least one memory 620 (and possibly also at least one interface 630), which may be operationally connected or coupled, for example by a bus 640 or the like, respectively.

The processor 610 and/or the interface 630 of the apparatus 600 may also include a modem or the like to facilitate communication over a (hardwire or wireless) link, respectively. The interface 630 of the apparatus 600 may include a suitable transmitter, receiver or transceiver connected or coupled to one or more antennas, antenna units, such as antenna arrays or communication facilities or means for (hardwire or wireless) communications with the linked, coupled or connected device(s), respectively. The interface 630 of the apparatus 600 is generally configured to communicate with at least one other apparatus, device, node or entity (in particular, the interface thereof).

The memory 620 of the apparatus 600 may represent a (non-transitory/tangible) storage medium and store respective software, programs, program products, macros or applets, etc. or parts of them, which may be assumed to comprise program instructions or computer program code that, when executed by the respective processor, enables the respective electronic device or apparatus to operate in accordance with the exemplifying embodiments of the present invention. Further, the memory 620 of the apparatus 600 may (comprise a database to) store any data, information, or the like, which is used in the operation of the apparatus.

In general terms, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the thus illustrated apparatus 600 is suitable for use in practicing one or more of the exemplifying embodiments of the present invention, as described herein.

When in the subsequent description it is stated that the processor (or some other means) is configured to perform some function, this is to be construed to be equivalent to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function.

According to exemplifying embodiments of the present invention, the thus illustrated apparatus 600 may represent or realize/embody a (part of a) radio access entity acting as/in a source cell of load balancing (i.e. an overloaded cell). Hence, the apparatus 600 may be configured to perform a procedure and/or exhibit a functionality and/or implement a mechanism, as described in FIG. 1 and for Cell A in any one of FIGS. 3 and 4.

Accordingly, the apparatus 600 may be caused or the apparatus 600 or its at least one processor 610 (possibly together with computer program code stored in its at least one memory 620), in its most basic form, may be configured to determine a load balancing condition, including at least one beam of beams providing beamformed radio access as a candidate beam and at least one target radio access entity for offloading terminal entities being currently served by the candidate beam, specify a load balancing hypothesis for a hypothetical case of deactivation of the candidate beam, including information on an impact of the hypothetical beam deactivation with respect to the terminal entities being currently served by the candidate beam by offloading to the at least one target radio access entity, inquire non-/acceptance of deactivation of the candidate beam from the at least one target radio access entity on the basis of the load balancing hypothesis, and deactivate the candidate beam if acceptance of deactivation of the candidate beam is inquired from the at least one target radio access entity.

According to exemplifying embodiments of the present invention, the thus illustrated apparatus 600 may represent or realize/embody a (part of a) a radio access entity acting as/in a target cell of load balancing (i.e. a non-overloaded cell). Hence, the apparatus 600 may be configured to perform a procedure and/or exhibit a functionality and/or implement a mechanism, as described in FIG. 2 and for Cell B in any one of FIGS. 3 and 4.

Accordingly, the apparatus 600 may be caused or the apparatus 600 or its at least one processor 610 (possibly together with computer program code stored in its at least one memory 620), in its most basic form, may be configured to obtain an inquiry of non-/acceptance of deactivation of a candidate beam, which is at least one beam of beams providing beamformed radio access, from a source radio access entity, said inquiry specifying a load balancing hypothesis for a hypothetical case of deactivation of the candidate beam, including information on an impact of the hypothetical beam deactivation with respect to terminal entities being currently served by the candidate beam by offloading to the radio access entity, decide on non-/acceptance of deactivation of the candidate beam on the basis of cell information of a cell of the radio access entity, including at least information on a load in the cell of the radio access entity, and provide, to the source radio access entity, an indication of non-/acceptance of deactivation of the candidate beam as a deciding result.

FIG. 7 shows a schematic diagram illustrating an example of a (functional) structure of apparatuses according to at least one exemplifying embodiment.

It is to be noted that the individual apparatuses shown in FIG. 7 are inherently independent from each other but could be operable to interwork, i.e. exemplifying embodiments of the present invention cover any one of these apparatuses alone or any combination of such apparatuses (including one or more of any one of these apparatuses).

As shown in FIG. 7, an apparatus 710 according to exemplifying embodiments of the present invention may represent or realize/embody a (part of a) a radio access entity acting as/in a source cell of load balancing (i.e. an overloaded cell). Such apparatus may comprise (at least) a unit or means (denoted as LB condition determining unit/means 711) for determining a load balancing condition, including at least one beam of beams providing beamformed radio access as a candidate beam and at least one target radio access entity for offloading terminal entities being currently served by the candidate beam, a unit or means (denoted as LB hypothesis specifying unit/means 712) for specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, a unit or means (denoted as beam deactivation non-/acceptance inquiring unit/means 713) for inquiring non-/acceptance of deactivation of the candidate beam from the at least one target radio access entity on the basis of the load balancing hypothesis, and a unit or means (denoted as beam deactivating unit/means 714) for deactivating the candidate beam if acceptance of deactivation of the candidate beam is inquired from the at least one target radio access entity.

As shown in FIG. 7, an apparatus 720 according to exemplifying embodiments of the present invention may represent or realize/embody a (part of a) a radio access entity acting as/in a source cell of load balancing (i.e. an overloaded cell). Such apparatus may comprise (at least) a unit or means a unit or means (denoted as beam deactivation non-/acceptance inquiry obtaining unit/means 721) for obtaining an inquiry of non-/acceptance of deactivation of a candidate beam, which is at least one beam of beams providing beamformed radio access, from a source radio access entity, said inquiry specifying a load balancing hypothesis for a hypothetical case of deactivation of the candidate beam, including information on an impact of the hypothetical beam deactivation with respect to terminal entities being currently served by the candidate beam by offloading to the radio access entity, a unit or means a unit or means (denoted as beam deactivation non-/acceptance deciding unit/means 722) for deciding on non-/acceptance of deactivation of the candidate beam on the basis of cell information of a cell of the radio access entity, including at least information on a load in the cell of the radio access entity, and a unit or means a unit or means (denoted as beam deactivation non-/acceptance providing unit/means 723) for providing, to the source radio access entity, an indication of non-/acceptance of deactivation of the candidate beam as a deciding result.

As described above, according to exemplifying embodiments of the present invention, the apparatus 600 as illustrated in FIG. 6 may represent or realize/embody a (part of a) a radio access entity acting as/in a source cell of load balancing (i.e. an overloaded cell). Hence, the apparatus 600 may be configured to perform a procedure and/or exhibit a functionality and/or implement a mechanism, as described in FIG. 5.

Accordingly, the apparatus 600 may be caused or the apparatus 600 or its at least one processor 610 (possibly together with computer program code stored in its at least one memory 620), in its most basic form, may be configured to determine a load balancing condition, including at least one beam of beams providing beamformed radio access as a candidate beam and at least one target radio access entity for offloading terminal entities being currently served by the candidate beam, and acquiring cell information of the at least one target cell of the at least one target radio access entity, including at least information on a load in the at least one target cell of the at least one target radio access entity, specify a load balancing hypothesis for a hypothetical case of deactivation of the candidate beam, including information on an impact of the hypothetical beam deactivation with respect to the terminal entities being currently served by the candidate beam by offloading to the at least one target radio access entity, decide on non-/acceptance of deactivation of the candidate beam for the at least one target radio access entity on the basis of the acquired cell information, and deactivate the candidate beam if acceptance of deactivation of the candidate beam is decided for the at least one target radio access entity.

Such apparatus may also be embodied by an apparatus 710 as illustrated in FIG. 7, which may comprise correspondingly adapted units or means, namely LB condition determining unit/means, cell information acquiring unit/means, LB hypothesis specifying unit/means, beam deactivation non-/acceptance deciding unit/means and beam deactivating unit/means.

For further details regarding the operability/functionality of the individual apparatuses (or units/means thereof) according to exemplifying embodiments of the present invention, reference is made to the above description in connection with any one of FIGS. 1 to 5, respectively.

According to exemplifying embodiments of the present invention, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

According to exemplifying embodiments of the present invention, a system may comprise any conceivable combination of any depicted or described apparatuses and other network elements or functional entities, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for enabling/realizing load balancing between neighboring cells in a system with beamformed radio access. Such measures exemplarily comprise determining a load balancing condition, including at least one beam as a candidate beam and at least one target radio access entity for offloading terminal entities being currently served by the candidate beam, specifying a load balancing hypothesis for a hypothetical case of deactivation of the candidate beam, including information on an impact of the hypothetical beam deactivation, inquiring non-/acceptance of deactivation of the candidate beam from the at least one target radio access entity on the basis of the load balancing hypothesis, and deactivating the candidate beam if acceptance of deactivation of the candidate beam is inquired from the at least one target radio access entity.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

LIST OF ACRONYMS AND ABBREVIATIONS

3GPP 3rd Generation Partnership Project
5G 5th Generation
5QI 5G QoS Indicator
CAC Composite Available Capacity
CIO Cell Individual Offset
gNB Next generation NodeB
HO Handover
LB Load Balancing
LTE Long Term Evolution
MIMO Multiple Input Multiple Output
NR New Radio
QoS Quality of Service
PRB Physical Resource Block
RRM Radio Resource Management
RSRQ Reference Signal Received Quality
RSRP Reference Signal Received Power
SINR Signal to Interference plus Noise Ratio SNR Signal to Noise Ratio
SLA Service Level Agreement
UE User Equipment

The invention claimed is:

1. A method, operable at or by a radio access entity, comprising:
   determining a load balancing condition, including at least one beam of beams providing beamformed radio access as a candidate beam and at least one target radio access entity for offloading terminal entities being currently served by the candidate beam,
   specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, wherein the specifying comprises:
      retrieving, for the terminal entities being currently served by the candidate beam, results of radio resource management measurements with respect to the at least one beam of beams providing beamformed radio access in a cell of the at least one target radio access entity and radio access in at least one cell of the at least one target radio access entity, and
      evaluating whether or not a coverage hole for one or more of the terminal entities being currently served by the candidate beam is caused when deactivating the candidate beam based on the retrieved radio resource management measurements results,
      wherein the load balancing hypothesis is specified when it is evaluated that a coverage hole is not caused for any one of the terminal entities being currently served by the candidate beam when deactivating the candidate beam;
   inquiring non-acceptance of deactivation of the candidate beam from the at least one target radio access entity on the basis of the load balancing hypothesis, and
   deactivating the candidate beam when acceptance of deactivation of the candidate beam is inquired from the at least one target radio access entity.

2. The method according to claim 1, wherein the determining comprises identifying one or more beams with a highest number of served terminal entities and/or a highest load in a cell of the at least one radio access entity as the candidate beam.

3. The method according to claim 1, wherein the determining comprises:
   identifying a load balancing situation in which a load in a cell of the at least one target radio access entity is high and a load in at least one target cell of the at least one target radio access entity is low, and/or
   identifying the at least one target radio access entity as a neighboring radio access entity of a neighboring cell to a cell of the at least one target radio access entity.

4. The method according to claim 1, wherein the specifying further comprises acquiring information on number and characteristics of the terminal entities being currently served by the candidate beam, wherein the load balancing hypothesis is specified based on the acquired information.

5. The method according to claim 1, wherein the specifying further comprises:
   retrieving, for the terminal entities being currently served by the candidate beam, radio resource management indicators with respect to one or more beams providing beamformed radio access in a cell of the at least one target radio access entity and radio access in at least one cell of the at least one target radio access entity, and/or characteristic information regarding operation/performance and/or service provisioning in the cell of the at least one target radio access entity, and
   setting the information on the impact of the hypothetical beam deactivation with respect to the terminal entities being currently served by the candidate beam based on the retrieved radio resource management indicators and/or characteristic information.

6. The method according to claim 5, wherein the information on the impact of the hypothetical beam deactivation for a respective candidate beam comprises:
   a beam identifier of the candidate beam subject to hypothetical beam deactivation; and one or more of:
   a number of terminal entities expected to be offloaded,
   a quality-of-service indicator of each terminal entity expected to be offloaded,
   a network slice identifier of each terminal entity expected to be offloaded,
   at least one beam identifier of at least one beam for serving terminal entities expected to be offloaded, when the at least one target radio access entity uses beamformed radio access, and
   at least one projected signal quality indication of each terminal entity expected to be offloaded.

7. The method according to claim 1, wherein the inquiring comprises:
   issuing, to the at least one target radio access entity, a request message, comprising a mobility change request, including an information element containing the information on the impact of the hypothetical beam deactivation for a respective candidate beam, and
   obtaining, from the at least one target radio access entity, a response message, comprising a mobility change acknowledge, including an information element containing an indication of acceptance of deactivation of at least one beam of a respective candidate beam, or a failure message, comprising a mobility change failure, including an information element containing an indication of non-acceptance of deactivation of any candidate beam.

8. The method according to claim 1, wherein:
   a cell of the at least one target radio access entity and a cell of the at least one target radio access entity employ the same carrier frequency, and/or
   the radio access entity and the at least one radio access entity serve or relate to neighboring cells, and/or
   the at least one target radio access entity and the at least one target radio access entity are radio access entities in a 5G/NR communication system.

9. An apparatus, operable as or at a radio access entity, comprising: at least one processor; and
   at least one non-transitory memory including a computer program code, wherein the at least one memory and the computer program code are configured, with the at least one processor, to cause the apparatus to perform at least the following:
   determining a load balancing condition, including at least one beam of beams providing beamformed radio access as a candidate beam and at least one target radio access entity for offloading terminal entities being currently served by the candidate beam,
   specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, wherein the specifying comprises:
  retrieving, for the terminal entities being currently served by the candidate beam, results of radio resource management measurements with respect to the at least one beam of beams providing beamformed radio access in a cell of the at least one target radio access entity and radio access in at least one cell of the at least one target radio access entity, and
  evaluating whether or not a coverage hole for one or more of the terminal entities being currently served by the candidate beam is caused when deactivating the candidate beam based on the retrieved radio resource management measurements results,
  wherein the load balancing hypothesis is specified when it is evaluated that a coverage hole is not caused for any one of the terminal entities being currently served by the candidate beam when deactivating the candidate beam;
inquiring non-acceptance of deactivation of the candidate beam from the at least one target radio access entity on the basis of the load balancing hypothesis, and
deactivating the candidate beam when acceptance of deactivation of the candidate beam is inquired from the at least one target radio access entity.

10. The apparatus according to claim 9, wherein the determining comprises identifying one or more beams with a highest number of served terminal entities and/or a highest load in a cell of the at least one radio access entity as the candidate beam.

11. The apparatus according to claim 9, wherein the determining comprises:
  identifying a load balancing situation in which a load in a cell of the at least one target radio access entity is high and a load in at least one target cell of the at least one target radio access entity is low, and/or
  identifying the at least one target radio access entity as a neighboring radio access entity of a neighboring cell to a cell of the at least one target radio access entity.

12. The apparatus according to claim 9, wherein the specifying further comprises acquiring information on number and characteristics of the terminal entities being currently served by the candidate beam, wherein the load balancing hypothesis is specified based on the acquired information.

13. The apparatus according to claim 9, wherein the specifying further comprises:
  retrieving, for the terminal entities being currently served by the candidate beam, radio resource management indicators with respect to one or more beams providing beamformed radio access in a cell of the at least one target radio access entity and radio access in at least one cell of the at least one target radio access entity, and/or characteristic information regarding operation/performance and/or service provisioning in the cell of the at least one target radio access entity, and
  setting the information on the impact of the hypothetical beam deactivation with respect to the terminal entities being currently served by the candidate beam based on the retrieved radio resource management indicators and/or characteristic information.

14. The apparatus according to claim 13, wherein the information on the impact of the hypothetical beam deactivation for a respective candidate beam comprises:
  a beam identifier of the candidate beam subject to hypothetical beam deactivation; and one or more of:
  a number of terminal entities expected to be offloaded,
  a quality-of-service indicator of each terminal entity expected to be offloaded,
  a network slice identifier of each terminal entity expected to be offloaded,
  at least one beam identifier of at least one beam for serving terminal entities expected to be offloaded, when the at least one target radio access entity uses beamformed radio access, and
  at least one projected signal quality indication of each terminal entity expected to be offloaded.

15. The apparatus according to claim 9, wherein the inquiring comprises:
  issuing, to the at least one target radio access entity, a request message, comprising a mobility change request, including an information element containing the information on the impact of the hypothetical beam deactivation for a respective candidate beam, and
  obtaining, from the at least one target radio access entity, a response message, comprising a mobility change acknowledge, including an information element containing an indication of acceptance of deactivation of at least one beam of a respective candidate beam, or a failure message, comprising a mobility change failure, including an information element containing an indication of non-acceptance of deactivation of any candidate beam.

16. The apparatus according to claim 9, wherein:
  a cell of the at least one target radio access entity and a cell of the at least one target radio access entity employ the same carrier frequency, and/or
  the radio access entity and the at least one radio access entity serve or relate to neighboring cells, and/or
  the at least one target radio access entity and the at least one target radio access entity are radio access entities in a 5G/NR communication system.

17. A non-transitory computer-readable medium comprising computer-executable instructions that, when executed by a processor, cause the processor to perform the following operations:
  determining a load balancing condition, including at least one beam of beams providing beamformed radio access as a candidate beam and at least one target radio access entity for offloading terminal entities being currently served by the candidate beam,
  specifying a load balancing hypothesis for a hypothetical case of deactivation of the candidate beam, including information on an impact of the hypothetical beam deactivation with respect to the terminal entities being currently served by the candidate beam by offloading to the at least one target radio access entity, wherein the specifying comprises:
    retrieving, for the terminal entities being currently served by the candidate beam, results of radio resource management measurements with respect to the at least one beam of beams providing beamformed radio access in a cell of the at least one target radio access entity and radio access in at least one cell of the at least one target radio access entity, and
    evaluating whether or not a coverage hole for one or more of the terminal entities being currently served by the candidate beam is caused when deactivating the candidate beam based on the retrieved radio resource management measurements results,
    wherein the load balancing hypothesis is specified when it is evaluated that a coverage hole is not caused for any one of the terminal entities being currently served by the candidate beam when deactivating the candidate beam;

inquiring non-acceptance of deactivation of the candidate beam from the at least one target radio access entity on the basis of the load balancing hypothesis, and deactivating the candidate beam when acceptance of deactivation of the candidate beam is inquired from the at least one target radio access entity.

18. The non-transitory computer-readable medium of claim 17, wherein the determining comprises identifying one or more beams with a highest number of served terminal entities and/or a highest load in a cell of the at least one radio access entity as the candidate beam.

19. The non-transitory computer-readable medium of claim 17, wherein the determining comprises:

identifying a load balancing situation in which a load in a cell of the at least one target radio access entity is high and a load in at least one target cell of the at least one target radio access entity is low, and/or identifying the at least one target radio access entity as a neighboring radio access entity of a neighboring cell to a cell of the at least one target radio access entity.

20. The non-transitory computer-readable medium of claim 17, wherein the inquiring comprises:

issuing, to the at least one target radio access entity, a request message, comprising a mobility change request, including an information element containing the information on the impact of the hypothetical beam deactivation for a respective candidate beam, and obtaining, from the at least one target radio access entity, a response message, comprising a mobility change acknowledge, including an information element containing an indication of acceptance of deactivation of at least one beam of a respective candidate beam, or a failure message, comprising a mobility change failure, including an information element containing an indication of non-acceptance of deactivation of any candidate beam.

* * * * *